United States Patent

Ito et al.

[11] Patent Number: 5,820,011
[45] Date of Patent: Oct. 13, 1998

[54] ULTRASONIC TOOL HORN

[75] Inventors: Masaya Ito, Nisshin; Haruo Yamamori, Nagoya; Katsumi Miyama, Sapporo; Tomoo Tanaka, Komaki, all of Japan

[73] Assignee: NGK Spark Plug Co., Ltd., Nagoya, Japan

[21] Appl. No.: 631,898

[22] Filed: Apr. 16, 1996

[51] Int. Cl.$^6$ .................................................. B23K 20/10
[52] U.S. Cl. ...................... 228/1.1; 156/580.1; 156/580.2
[58] Field of Search ........................ 228/1.1; 156/580.2, 156/580.1, 73.1

[56] References Cited

U.S. PATENT DOCUMENTS 4,747,895  5/1988  Wallerstein et al. .................. 156/73.3

FOREIGN PATENT DOCUMENTS 36 40 244 A1  2/1988  Germany .
63-113545  7/1988  Japan .
1-146928  10/1989  Japan .
5-80569  11/1993  Japan .

OTHER PUBLICATIONS

Sass et al., "Properties and Use of Non–Ferrous Metals", Handbook for Mechanical Engineering, p. 539, 1958.

*Primary Examiner*—Kenneth J. Ramsey
*Attorney, Agent, or Firm*—Foley & Lardner

[57] ABSTRACT

A ultrasonic tool horn for use in ultrasonic machining, welding, etc. has a horn main body made of a heat-treatable aluminum alloy. The aluminum alloy is heat treated so as to be as hard as 100 or more on the Vickers hardness scale. In one embodiment, a thin intermediate layer of a non-heat-treatable aluminum alloy is provided between the horn main body and a ceramic tool attached to a slender end portion of the horn main body.

8 Claims, 3 Drawing Sheets

ULTRASONIC TOOL HORN

BACKGROUND OF THE INVENTION

1. Field of the Invention

The present invention relates to a tool or a tool assembly, which is called an ultrasonic tool horn, for use in ultrasonic machines such as an ultrasonic perforating machine, ultrasonic pressing machine, ultrasonic caulking machine, ultrasonic soldering machine and ultrasonic cutting machine, and further for use in an ultrasonic cleaning machine and ultrasonic mixing machine.

2. Description of the Prior Art

Ultrasonic tool horns made of steel, titanium alloy and aluminum alloy have heretofore been known. In the case where the ultrasonic tool horn is used for ultrasonic machining or ultrasonic cleaning, the tip end portion of the tool horn is required to be resistant to wear and erosion. For this reason, a tool horn made of steel is quench-hardened, while a tool horn made of titanium alloy is hardened by nitriding. Further, in order to improve the wear resistance of the tip end face of the tool horn, it has been proposed to form a ceramic layer on the tip end face of the tool horn as disclosed in, for example, Japanese Utility Model Provisional Publication Nos. 63-113545 and 1-146928. Further, it has been proposed to attach a ceramic tool to the tip end portion of the tool horn by way of a buffer plate as disclosed in Japanese Utility Model Provisional Publication No. 4-29305.

In the case of the tool horn made of steel, the specific weight of steel is nearly eight, so a high power is necessitated for excitation of the tool horn and a larger electric source is required for increasing the output. Further, the amount of heat generated by the tool horn increases as the output becomes higher.

In contrast to this, in the case of the tool horn made of aluminum or aluminum alloy for use in plastic welding or ultrasonic caulking, its specific weight is smaller than that of the tool horn made of steel, so excitation of the tool horn can be attained without the use of a large electric source. However, as the output is increased to increase the amplitude of vibration, the stress induced in the tool horn becomes larger, resulting in a possibility of causing cracks in the tool horn.

Further, in the case where this kind of tool horn is used in an ultrasonic cleaning machine or in liquid such as emulsified or dispersed liquid, it has a problem with erosion resistance.

Further, when the machining tip end face of the tool horn is caused to wear or erode, the resonance point is displaced and decreases the amplitude of excitation, resulting in lowered machining efficiency. That is, in an ordinary ultrasonic machine, the frequency used thereby is previously set to a constant value. Thus, when the tip end portion of the tool horn is worn or eroded and changes the resonance point of the tool horn, the output is lowered even if the horn is not broken, and replacement of the horn is necessitated. Since it takes a large amount of time to replace and adjust the tool horn, there is caused a problem that the working ratio of the machine is lowered.

SUMMARY OF THE INVENTION

According to an aspect of the present invention, there is provided an ultrasonic tool horn which comprises a horn main body having a slender end portion, and a ceramic tool attached to the slender end portion of the horn main body, wherein the horn main body is made of a heat-treatable aluminum alloy.

According to another aspect of the present invention, the ceramic tool has a four-point bending strength of 600 MPa or more or a coefficient of thermal expansion of $7 \times 10^{-6}/°$ C. or more, or both.

According to a further aspect of the present invention, the heat-treatable aluminum alloy is as hard as 100 or more on the Vickers hardness scale.

According to a further aspect of the present invention, there is provided an ultrasonic tool horn which comprises a horn main body having a slender end portion, a ceramic tool attached to the slender end portion of the horn main body, the horn main body being made of a heat-treatable aluminum alloy, and at least one intermediate layer interposed between the horn main body and the ceramic tool and made of soft metal mainly containing aluminum.

In the ultrasonic tool horn of this invention, it is preferable to use a 2000 series of Al—Cu—Mg alloys, a 4000 series of Al—Si and a 7000 series of Al—Mn—Mg—Cu alloys which are defined in Japanese Industrial Standards and which are treated by an aging process, as a heat-treatable aluminum alloy for constituting the tool horn main body. It is also preferable that the alloys are as hard as 100 or more on the Vickers hardness scale.

In this manner, by the effect of employing an aluminum alloy that is treated by an aging process, i.e., of the heat-treatable type, for constituting the horn main body, the horn main body has high strength, thus making it possible to eliminate breakage of the tool horn during use.

Preferably, the ceramic tool attached to the slender end portion of the horn main body has a four-point bending strength of 600 MPa or more or a coefficient of thermal expansion of $7 \times 10^{-6}/°$ C. or more, or both. Enumerated as a ceramic material to meet this end are zirconia, alumina, silicon nitride, sialon, silicon carbide, cermet, hard alloy, or the like high strength materials.

In the case where the ceramic tool attached to the slender end portion of the horn main body is formed of a ceramic material having the four-point bending strength of 600 MPa or more, it becomes least possible that chipping of the tool horn occurs in use and breakage of the ceramic material occurs at the time of joining of the horn main body and the ceramic tool. In the case where the ceramic tool is formed of a ceramic material having the coefficient of thermal expansion of $7 \times 10^{-6}/°$ C. or more, it becomes least possible that breakage of the ceramic material occurs at the time of brazing. Further, in the case where the tool is formed of a ceramic material which is larger in both the four-point bending strength and the coefficient of thermal expansion than desired values, it becomes possible to join the horn main body and the ceramic tool directly without interposing therebetween an intermediate layer.

Further, in the ultrasonic tool horn according to another aspect of the present invention, there can be enumerated as a material for forming a soft intermediate layer mainly containing aluminum, a 1000 series of pure aluminum, a 3000 series of Al—Mn alloys, 5000 series of Al—Mg alloys or the like non-heat-treatable aluminum alloys which are defined in the Japanese Industrial Standards. In this connection, the 5000 series of Al—Mg alloys are higher in strength as compared with the pure aluminum and the 3000 series of Al—Mn alloys and thus can be suitably used in the case where the joint between the horn main body and the ceramic tool is subjected to high stress. However, when the soft intermediate layer is too hard, the joining strength is lowered, so it is desirable that the intermediate layer is as hard as 70 or less on the Vickers hardness scale. Further, since there is a possibility of yielding or buckling of the intermediate layer, it is preferable that the thickness of the intermediate layer is selected within the range of from 0.1 mm to 1 mm.

The ultrasonic tool horn structured in the above manner can lower or mitigate the residual stress which is caused at the time of joining by heating, i.e., brazing, due to the fact that the ceramic material has a smaller coefficient of thermal expansion than aluminum alloy, and prevent cracking of the ceramic tool effectively.

The above structure is effective for solving the above noted problems inherent in the prior art device.

It is accordingly an object of the present invention to provide a novel and improved ultrasonic tool horn which has an excellent wear resistance and erosion resistance and can prevent occurrence of a crack or cracks while being capable of effecting stable operation over an elongated period of use.

DETAILED DESCRIPTION OF THE PREFERRED EMBODIMENTS

Figures 1A, 1B:
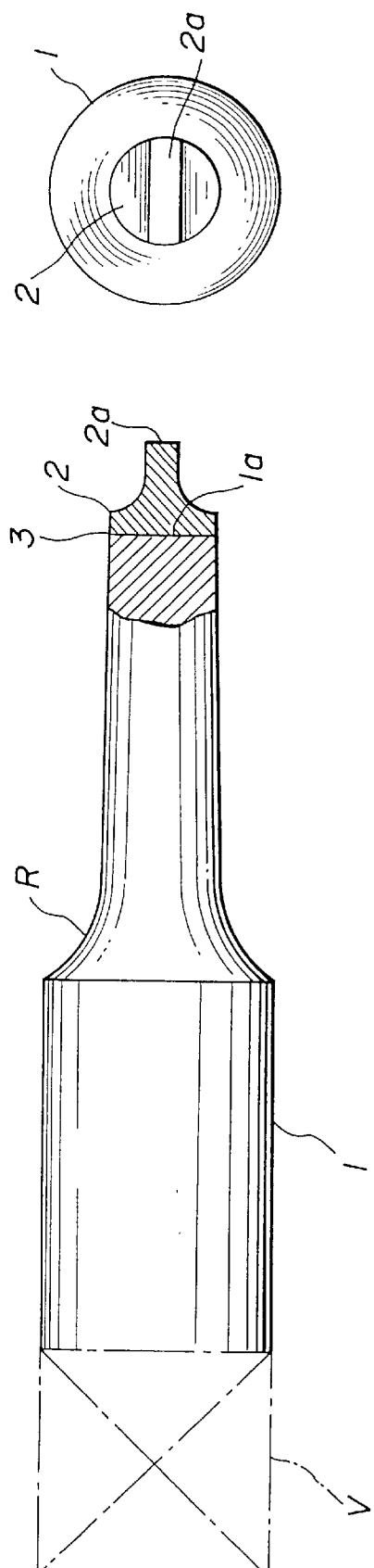
FIG. 1A is a side elevational view, partly sectioned, of an ultrasonic tool horn according to an embodiment of the present invention.
FIG. 1B is a view taken from the tip end side of the tool horn.

Referring first to FIGS. 1A and 1B, an ultrasonic tool horn according to an embodiment of the present invention is shown as being made up of a cylindrical horn main body 1 shaped so as to start reducing in diameter at an intermediate portion thereof and become gradually more slender toward an end, i.e., shaped so as to be stepped and rounded as indicated by "R" at an intermediate portion and then slightly taper toward an end, and a ceramic tip or tool 2 brazed to a tip end face 1a of the horn main body 1 and shaped to have, at a tip end portion thereof, a machining surface 2a in the form of a band or strip and have a nearly T-shaped section with respect to a longitudinal sectional plane crossing the elongated direction of the machining surface 2a at right angles. The cylindrical horn main body 1 is made of JIS-A-2024 aluminum alloy (i.e., Al—Cu alloy according to Japanese Industrial Standard No. A2024). The ceramic tool 2 is made of zirconia ($ZrO_2$ added with $Al_2O_3$ and $Y_2O_3$) and has a plurality of metallized layers of Ti, Ni and Mo which are formed in sequence on the surface of the zirconia by means of vapor deposition. The ceramic tool 2 is brazed to the tip end face 1a of the horn main body 1, using an Al—Cu—Si brazing metal 3 interposed therebetween and being held within a nitrogen gas atmosphere at the temperature of 550° C. for two hours. Thereafter, the ceramic tool 2 is held at the temperature of 480° C. and water cooled in order to attain a desired strength, and then, after lapse of time of 50 hours for room temperature aging, finished to the shape shown in FIGS. 1A and 1B. The tip end face 2a of the ceramic tool 2 is in the form of a strip or band of the size of 1 mm×10 mm, i.e., of 1 mm wide and 10 mm long.

Further, attached to a basic end portion of the cylindrical horn main body 1, i.e., a larger end portion of the same, is an ultrasonic vibrator "V" which is depicted by dotted chain lines.

By using the ultrasonic tool horn shown in FIGS. 1A and 1B, which was made to vibrate at the frequency of 28.8 KHz by the input of 100 W, cutting of nylon fibers was carried out for one hundred successive hours. By this, it was found that there were not caused any wear of the ceramic tool 2 and any displacement of the resonance point. Further, in this connection, the hardness of the JIS-A-2024 aluminum alloy forming the horn main body 1 was Hv 122 (i.e., 122 by Vickers hardness scale). A comparative example similar in shape to that shown in FIGS. 1A and 1B and made of only JIS-A-2024 aluminum alloy was prepared and used for cutting of nylon fibers for one hundred successive hours. By this, it was found that the tip end showed a wear of 120 μm.

Figure 2A:
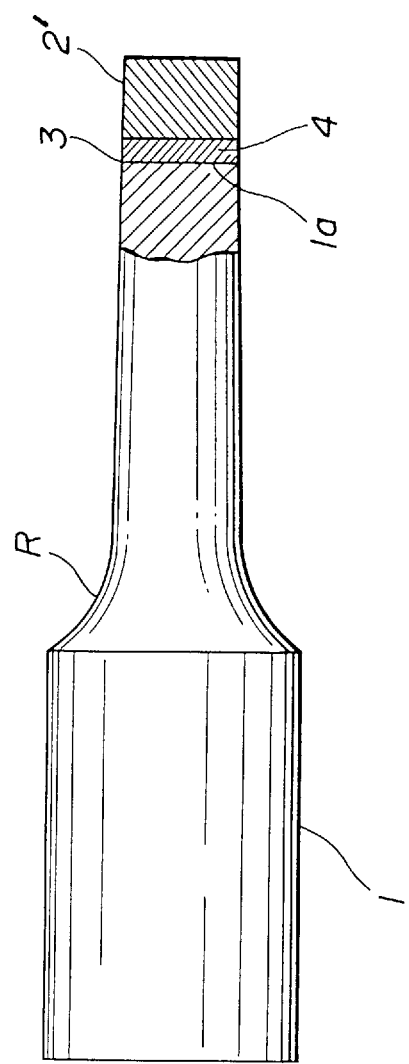
FIGS. 2A and 2B are views similar to FIGS. 1A and 1B, respectively but show another embodiment of the present invention.
Figure 2B:
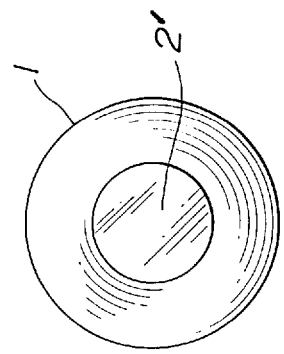

Referring to FIGS. 2A and 2B, an ultrasonic tool horn according to another embodiment of this invention includes a horn main body 1 similar to that of the previous embodiment of FIGS. 1A and 1B, a cylindrical ceramic tool 2' of 8 mm in diameter and 5 mm long or thick, and an intermediate layer 4 made of a non-heat-treatable aluminium alloy (e.g., JIS-A-5052 or JIS-A-1050) and interposed between the ceramic tool 2' and the horn main body 1. The intermediate layer 4 is capable of reducing the residual stress caused when the horn main body 1 and the ceramic tool 2' are brazed with a brazing metal 3. Several kinds of intermediate layers 4 having different thicknesses lower than 1.5 mm are employed in order to prevent the intermediate layers 4 themselves from yielding to deform or break in use.

Figure 3:
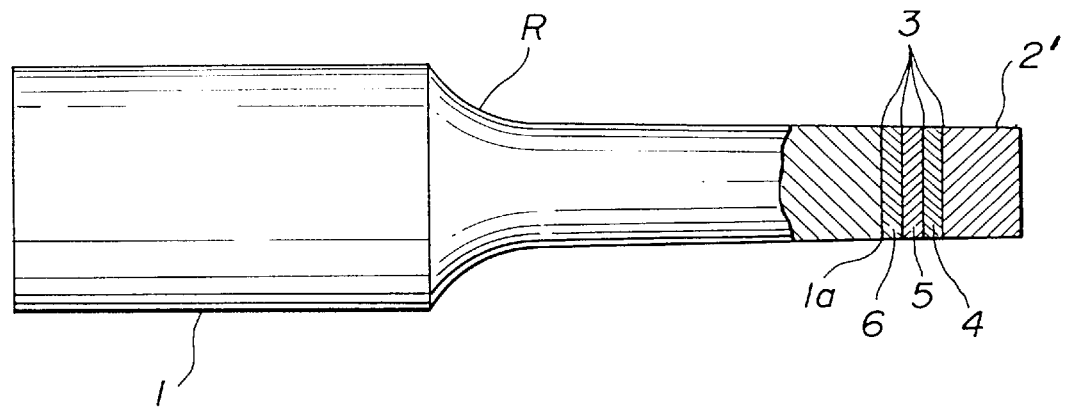
FIG. 3 is a view similar to FIG. 2A but shows a variant of the ultrasonic tool horn of FIG. 2A.

FIG. 3 shows a variant of the ultrasonic tool horn of FIG. 2. In this variant, three intermediate layers 4, 5 and 6 made of non-heat-treatable aluminum alloy (e.g., JIS-A-5052 or JIS-A-1050) are interposed between the horn main body 1 made of aluminum alloy and the ceramic tool 2'. Also in this case, the ceramic tool 2', after brazed to the horn main body 1 with brazing metal 3, is held at the temperature of 480° C. and water cooled in order to attain a desired strength, and then, after a lapse of time of 50 hours for room temperature aging, finished to the shape shown in FIG. 3.

The ultrasonic tool horn structured in the above manner was installed on an ultrasonic vibration testing machine of the excitation frequency of 28.8 kHz and of the output of 100 W and was made to vibrate at the tip end amplitude of 100 μm for 100 hours, and it was found that nothing abnormal or defective was caused at the ceramic tool and at the joint between the ceramic tool and the horn main body.

Although in the structure shown in FIG. 3 three intermediate layers are provided, two or more than four intermediate layers may be provided in place thereof.

Table 1 shows the ceramic materials used for the ceramic tools 2 and 2' of the ultrasonic tool horn of FIGS. 1 to 3. The four-point bending strength in Table 1 was measured in accordance with the method defined by JIS-R-1601. The four-point bending strength is measured at the room temperature, and the coefficient of thermal expansion is determined based on a temperature variation from the room temperature to 800° C.

TABLE 1

| Ceramic Material | Composition | Additives | Four-point Bending Strength (MPa) | Coefficient of Thermal Expansion ($\times 10^{-6}/°C.$) |
|---|---|---|---|---|
| Zirconia | $ZrO_2$ | $Al_2O_3$, $Y_2O_3$ | 600 | 9.5 |
| Alumina | $Al_2O_3$ | $SiO_2$, CaO, MgO | 500 | 7.9 |
| Silicon Nitride | $Si_3N_4$ | $Al_2O_3$, $Y_2O_3$ | 900 | 2.8 |

Figure 4:
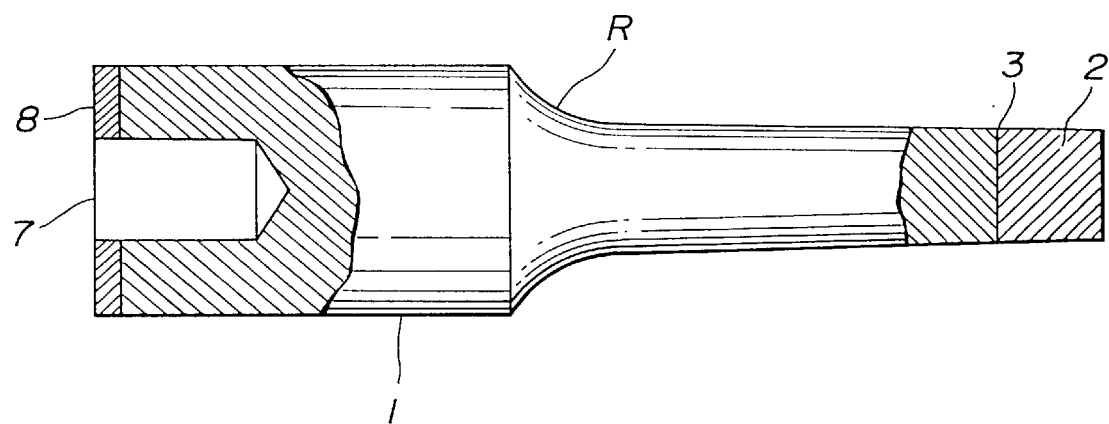
FIG. 4 is a side elevational view, partly sectioned, of a test ultrasonic tool horn constructed in accordance with the embodiment of FIGS. 1A and 1B.

In order to examine the characteristics or properties of the ultrasonic tool horns according to the embodiment of FIGS. 1 to 3, the ceramic materials shown in Table 1 were used for making the ultrasonic tool horns having the structures of FIGS. 1 to 3. As shown in FIG. 4, the horn main body is formed with a threaded hole 7 for attachment of the ultrasonic vibrator "V", and its end portion is cut, as indicated by the reference numeral 8, so that the resonance point of each tool horn is set to 28 kHz. In the above manner, twelve test tool horns No. 1~No. 12 were prepared. Each test ultrasonic tool horn was treated, after brazing, by an aging process so that the hardness of the horn main body was Hv 100 or more (i.e., 100 or more on the Vickers hardness scale). For the purpose of comparison, ultrasonic tool horns whose horn main body was made of an aluminum alloy of the hardness of Hv 100 or less (i.e., 100 or less on the Vickers hardness scale) were prepared and indicated by example No. 13 and No. 14. In Table 2, 1st layer, 2nd layer and 3rd layer are the intermediate layers which are so numbered in the order of arrangement from the side of the ceramic tool, and A2024, A7075 and A5052 represent aluminum alloys according to JIS-A-2024, JIS-A-7075 and JIS-A-5052, respectively.

Each ultrasonic tool horn prepared in the above manner was installed on a supersonic vibration testing machine of the excitation frequency of 28.8 KHz and of the output of 100 W and subjected to the test by increasing the input until an abnormality was caused in the tool horn. The results also shown in Table 2.

From Table 2, it will be seen that in example No. 13 and example No. 14, in which the horn main body is as hard as Hv 100 or less (i.e., 100 or less on the Vickers hardness scale), a crack was caused in the horn main body at the amplitude of 60 μm or less. In contrast to this, in example Nos. 1 to 12, in which the horn main body is as hard as Hv 100 or more (i.e. 100 or more on the Vickers hardness scale), no crack was caused in the horn main body even at a high amplitude of 65 μm or more for many hours.

Further, it will be seen that in the examples having the intermediate layers, the more desirable result can be obtained in the case where the thickness of the intermediate layer is 1 mm or less.

Further, it will be seen that zirconia which is larger both in four-point bending strength and coefficient of thermal expansion than desired values, i.e., whose four-point bending strength is 600 MPa or more and coefficient of thermal expansion is $7 \times 10^{-6}/°$ C. or more, is most desirable among the ceramic materials employed for forming the ceramic tools of the test ultrasonic tool horns.

While the horn main body is described and shown as being formed into a stepped cylindrical shape consisting of a uniform cylindrical half and a tapering half tapering toward an end, it may be formed into a conical shape, an exponential shape (i.e., a shape whose cross-sectional area changes exponentially with axial distance), or any other shape that is determined in view of its use.

From the foregoing, it will be understood that by forming a horn main body of a heat-treatable aluminum alloy and processing it in such a manner that the horn main body is as hard as Hv 100 or more (i.e., 100 or more on the Vickers hardness scale) according to the present invention, the tool horn can be excited with a comparatively smaller electric source and can be prevented from damage or breakage even when it is excited to vibrate at a high amplitude. It becomes possible to apply a high load to the tool horn and thereby improve the ultrasonic machining efficiency considerably and it becomes possible to use the tool horn with improved stability for an elongated period of usage.

It will be further understood that by interposing an intermediate layer made of a non-heat-treatable aluminum alloy between a horn main body and a ceramic tool, it becomes possible to reduce the residual stress caused when the ceramic tool is brazed to the horn main body, and thereby it becomes possible to prevent a crack or cracks from being formed in the tool.

TABLE 2

| Example No. | Horn Main Body | | Material of Ceramic Tool | Intermediate Layer | | Brazing Metal | Vickers Hardness No. of Intermediate Layer after Brazing | Results | Remarks |
|---|---|---|---|---|---|---|---|---|---|
| | Material | Vickers Hardness No. | | Material | Thickness (mm) | | | | |
| No. 1 | A2024 | 121 | Zirconia | Not Provided | | AlCuSi | — | Good(1)* | Invention |
| No. 2 | A2024 | 124 | Zirconia | A5052 | 0.25 | AlCuSi | 60 | Good(1) | Invention |
| No. 3 | A2024 | 124 | Zirconia | A5052 | 1.0 | AlCuSi | 58 | Good(1) | Invention |
| No. 4 | A2024 | 124 | Zirconia | A5052 | 1.5 | AlCuSi | 57 | Deformation(1) | Invention |
| No. 5 | A2024 | 124 | Alumina | Not Provided | | AlCuSi | — | Damage* | Invention |
| No. 6 | A2024 | 124 | Alumina | Not Provided | | AlCuSi | — | Good(2)* | Invention |
| No. 7 | A2024 | 122 | Alumina | A5052 | 0.5 | AlCuSi | 61 | Good(1) | Invention |
| No. 8 | A2024 | 122 | Silicon Nitride | A5052 | 0.5 | AlCuSi | 57 | Good(1) | Invention |
| No. 9 | A7075 | 148 | Silicon Nitride | A1050 | 0.5 | AlCuSi | 29 | Deformation(2)* | Invention |
| No. 10 | A2024 | 124 | Silicon Nitride | A5052 (1st Layer) | 0.5 | AlCuSi | 60 | Good(1) | Invention |
| | | | | A1050 (2nd Layer) | 0.5 | AlCuSi | 28 | | |
| No. 11 | A2024 | 122 | Silicon Nitride | A2052 (1st Layer) | 0.25 | AlCuSi | 61 | Good(1) | Invention |

TABLE 2-continued

| Example No. | Horn Main Body | | Material of Ceramic Tool | Intermediate Layer | | Brazing Metal | Vickers Hardness No. of Intermediate Layer after Brazing | Results | Remarks |
|---|---|---|---|---|---|---|---|---|---|
| | Material | Vickers Hardness No. | | Material | Thickness (mm) | | | | |
| | | | | A1050 (2nd Layer) | 0.25 | AlCuSi | 32 | | |
| No. 12 | A2024 | 124 | Silicon Nitride | A2052 (1st Layer) | 0.5 | AlCuSi | 57 | Good(1) | Invention |
| | | | | A1050 (2nd Layer) | 0.5 | AlCuSi | 30 | | |
| | | | | A5052 (3rd Layer) | 0.5 | AlCuSi | 57 | | |
| No. 13 | A5052 | 55 | Zirconia | Not Provided | | AlCuSi | — | Crack(1)* | Comparative Example |
| No. 14 | A5052 | 76 | Alumia | Not Provided | | AlCuSi | — | Crack(2)* | Comparative Example |

*Good(1) indicates that no damage was caused after vibrations at the amplitude of 100 μm for 100 consecutive hours.
Good(2) indicates that no damage was caused after vibrations at the amplitude of 75 mm for for 100 consecutive hours.
Deformation(1) indicates that deformation of the intemediate layer was caused by vibrations at the amplitude of 75 μm.
Deformation(2) indicates that deformation of the intermediate layer was caused by vibrations at the amplitude of 90 μm.
Damage indicates that damage at the joint between the ceramic tool and the horn main body was caused by vibrations at the amplitude of 65 μm.
*Crack(1) indicates that crack was caused at the rounded intermediate portion "R" of the horn main body by vibrations at the amplitude of 40 μm.
Crack(2) indicates that crack was caused at the rounded intermediate portion "R" of the horn main body by vibrations at the amplitude of 60 μm.

What is claimed is:

1. An ultrasonic tool horn comprising:
   a horn main body having a slender end portion; and
   a ceramic tool attached to said slender end portion of said horn main body;
   wherein said horn main body is made of a heat-treatable aluminum alloy having a hardness of at least 100 on the Vickers hardness scale.

2. An ultrasonic tool horn according to claim 1, wherein said ceramic tool has at least one of a four-point bending strength of at least 600 MPa and a coefficient of thermal expansion of at least $7 \times 10^{-6}/°$ C.

3. An ultrasonic tool horn comprising:
   a horn main body having a slender end portion;
   a ceramic tool attached to said slender end portion of said horn main body;
   said horn main body being made of a heat-treatable aluminum alloy having a hardness of at least 100 on the Vickers hardness scale; and
   at least one intermediate layer interposed between said horn main body and said ceramic tool and made of soft metal mainly containing aluminum.

4. An ultrasonic tool horn according to claim 3, wherein said ceramic tool has at least one of a four-point bending strength of at least 600 MPa and a coefficient of thermal expansion of at least $7 \times 10^{-6}/°$ C.

5. An ultrasonic tool horn comprising:
   a horn main body having a reduced-diameter end portion; and
   a ceramic tool attached to said reduced-diameter end portion of said horn main body;
   wherein said horn main body is made of a heat-treatable aluminum alloy having a hardness of at least 100 on the Vickers hardness scale.

6. An ultrasonic tool according to claim 5, further comprising at least one intermediate layer interposed between said horn main body and said ceramic tool and made of metal having a hardness of no more than 70 on the Vickers hardness scale.

7. An ultrasonic tool according to claim 6, wherein said at least one intermediate layer has a thickness within the range of 0.1 mm to 1 mm.

8. An ultrasonic tool horn according to claim 5, wherein said ceramic tool has at least one of a four-point bending strength of at least 600 MPa and a coefficient of thermal expansion of at least $7 \times 10^{-6}/°$ C.

* * * * *

UNITED STATES PATENT AND TRADEMARK OFFICE
CERTIFICATE OF CORRECTION

PATENT NO. : 5,820,011
DATED : October 13, 1998
INVENTOR(S) : Masaya ITO et al.

It is certified that error appears in the above-indentified patent and that said Letters Patent is hereby corrected as shown below:

On the title page insert --[30] Foreign Application Priority Data, Japanese 7-094026 filed April 19, 1995 and Japanese 8-010941 filed January 25, 1996--.

Signed and Sealed this

Eighth Day of June, 1999

Attest:

Q. TODD DICKINSON

*Attesting Officer*    *Acting Commissioner of Patents and Trademarks*